(12) United States Patent
Tsumiyama et al.

(10) Patent No.: US 8,316,977 B2
(45) Date of Patent: Nov. 27, 2012

(54) UTILITY VEHICLE

(75) Inventors: Yoshinori Tsumiyama, Lincoln, NE (US); Hidetoshi Kaku, Lincoln, NE (US); Tyler Furman, Raymond, NE (US); Kazuhiro Maeda, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 111 days.

(21) Appl. No.: 12/976,846

(22) Filed: Dec. 22, 2010

(65) Prior Publication Data

US 2012/0160586 A1 Jun. 28, 2012

(51) Int. Cl.
*B60N 2/015* (2006.01)
*B62D 21/03* (2006.01)

(52) U.S. Cl. ............... 180/89.17; 180/312; 296/37.15; 297/188.09

(58) Field of Classification Search ............ 180/69.24, 180/89.1, 89.14, 89.17, 312; 280/781, 783; 296/37.15, 63, 64, 65.01, 65.03, 65.05, 65.11, 296/190.08, 203.01; 297/188.08, 188.09, 297/188.1, 188.12, 331, 332, 336
See application file for complete search history.

(56) References Cited

U.S. PATENT DOCUMENTS

| | | | | |
|---|---|---|---|---|
| 4,040,501 A | * | 8/1977 | Haswell | 180/89.18 |
| 4,770,263 A | * | 9/1988 | Yoshioka | 180/89.17 |
| 4,785,900 A | * | 11/1988 | Nasky | 180/89.14 |
| 7,270,045 B1 | * | 9/2007 | Gonzalez | 89/36.02 |
| 2006/0244281 A1 | * | 11/2006 | Cover | 296/37.15 |
| 2007/0240927 A1 | * | 10/2007 | Kitai et al. | 180/312 |
| 2007/0289792 A1 | * | 12/2007 | Bataille et al. | 180/89.17 |
| 2008/0084082 A1 | * | 4/2008 | Nakamura et al. | 296/37.15 |
| 2009/0183938 A1 | * | 7/2009 | Cover et al. | 180/291 |

FOREIGN PATENT DOCUMENTS

JP 2007-276703 A 10/2007

OTHER PUBLICATIONS

Cambridge Dictionary of American English Definition of "Frame."*

* cited by examiner

*Primary Examiner* — Joseph Rocca
(74) *Attorney, Agent, or Firm* — Alleman Hall McCoy Russell & Tuttle LLP (57) ABSTRACT

A utility vehicle comprises a vehicle body frame to which the engine is mounted; a seat frame fastened to the vehicle body frame and including a seat bottom support member; and a seat bottom detachably fastened to the seat bottom support member; wherein a portion of an upper wall surface of an engine room in which the engine is disposed is defined by at least a portion of a lower surface of the seat bottom.

5 Claims, 11 Drawing Sheets

UTILITY VEHICLE

BACKGROUND OF THE INVENTION

1. Field of the Invention

The present invention relates to a utility vehicle including a vehicle body frame, a seat frame fastened to the vehicle body frame, and a seat bottom fastened to the seat frame.

2. Description of the Related Art

Typically, in utility vehicles, an engine is mounted to a center portion of a vehicle body frame, and pipes constituting the vehicle body frame are arranged to cover the engine. In this construction, an operator cannot easily access the engine to maintain the engine, which makes it difficult for the operator to carry out a maintenance operation efficiently.

Under the circumstances, techniques for enabling the operator to easily access the engine have been developed. One example is disclosed in Japanese Laid-Open Patent Application Publication No. 2007-276703. In this technique, since a seat support frame of a vehicle body frame, which is disposed in the vicinity of the engine, is displaceable, the operator can easily access the engine to maintain the engine by displacing the seat support frame. In this technique, however, because of a complex structure of the seat support frame, a cost of the seat support frame increases. Accordingly, it is desirable to enable the operator to easily access the engine with a simple and inexpensive configuration.

SUMMARY OF THE INVENTION

A utility vehicle of the present invention comprises a vehicle body frame to which an engine is mounted; a seat frame fastened to the vehicle body frame and including a seat bottom support member; and a seat bottom detachably fastened to the seat bottom support member; wherein a portion of an upper wall surface of an engine room in which the engine is disposed is formed by at least a portion of a lower surface of the seat bottom.

In accordance with this configuration, since a portion of the upper wall surface of the engine room in which the engine is disposed is defined by at least a portion of the lower surface of the seat bottom, an opening can be provided on the portion of the upper wall surface of the engine room by merely detaching the seat bottom. The engine is easily accessible through the opening when the engine is maintained.

The above and further objects and features of the invention will more fully be apparent from the following detailed description with accompanying drawings.

DETAILED DESCRIPTION OF THE PREFERRED EMBODIMENTS

Hereinafter, an embodiment of the present invention will be described with reference to the drawings. The stated directions are referenced from the perspective of a driver riding in a utility vehicle, unless otherwise explicitly noted.

Figure 1:
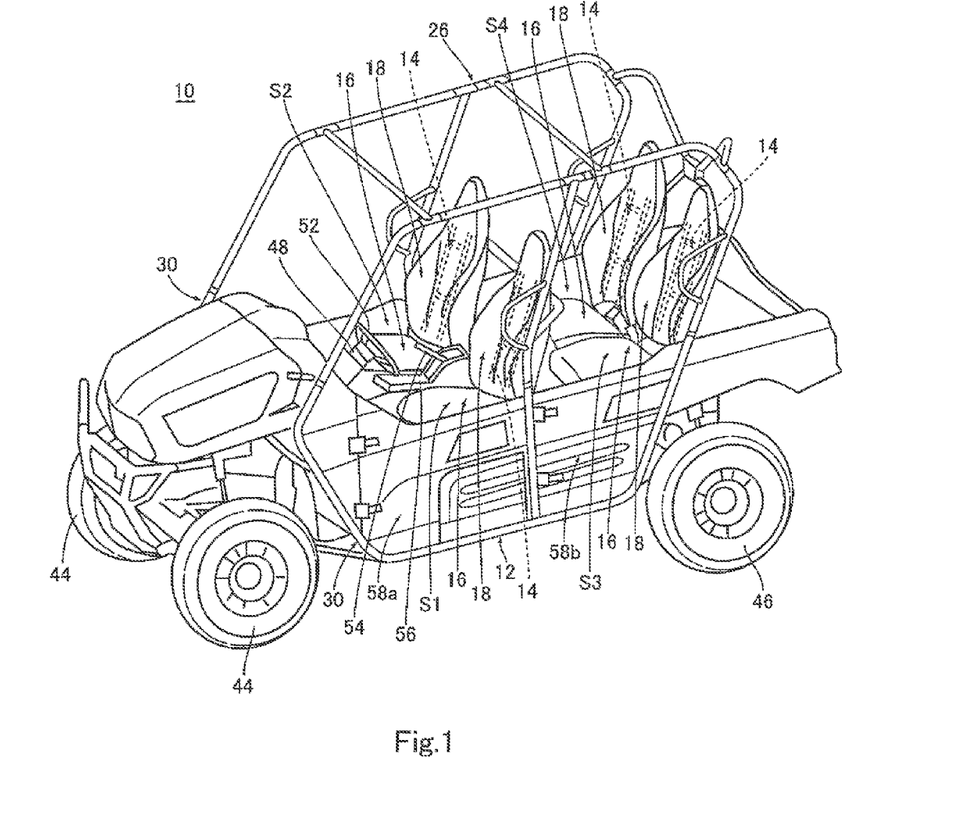
FIG. 1 is a perspective view showing an external appearance of a utility vehicle according to Embodiment 1.
Figure 2:
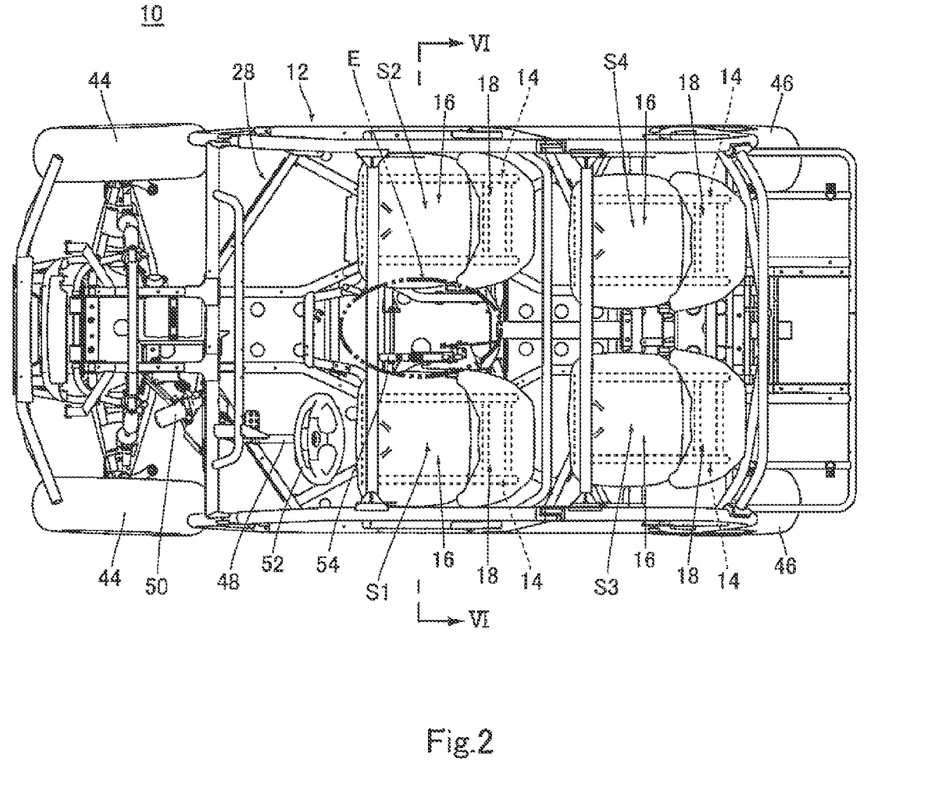
FIG. 2 is a plan view showing a construction of the utility vehicle according to Embodiment 1.
Figure 3:
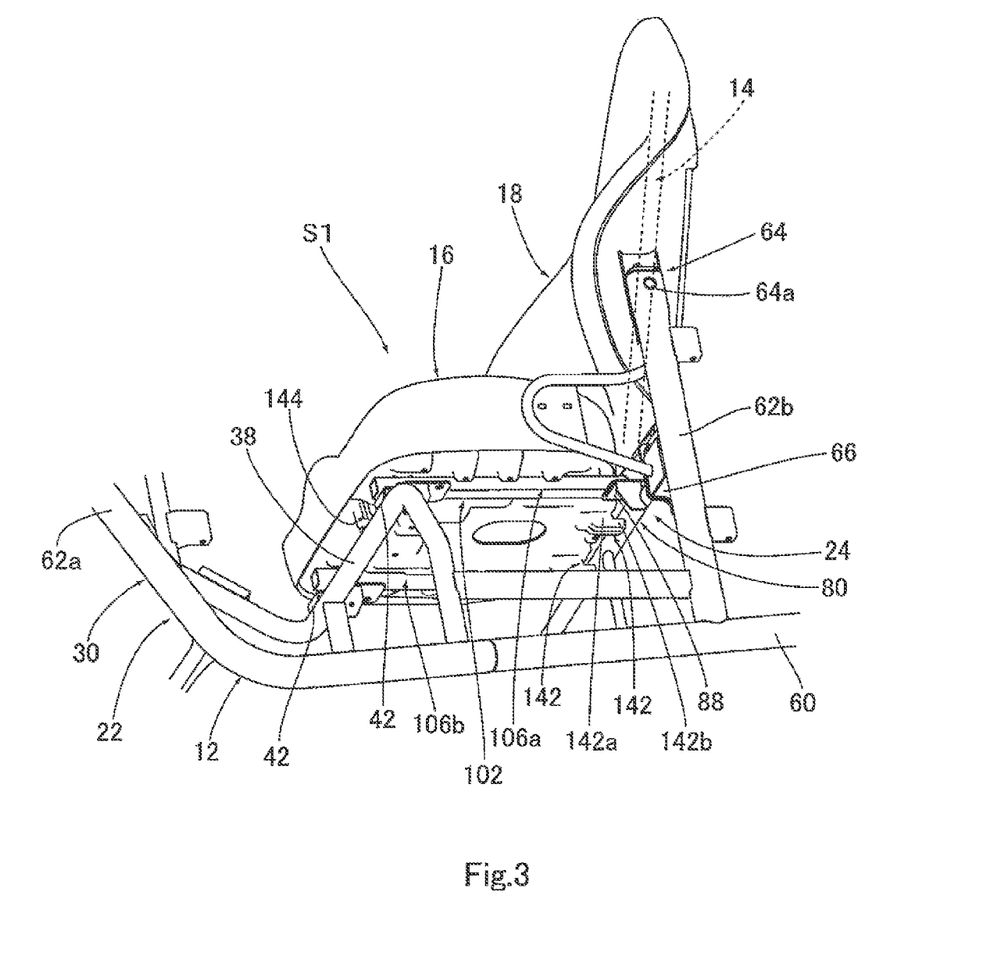
FIG. 3 is a perspective view showing a state where a seat is mounted to a vehicle body frame, as viewed from obliquely downward.

FIG. 1 is a perspective view showing an external appearance of a utility vehicle 10 according to Embodiment 1. FIG. 2 is a plan view showing a configuration of the utility vehicle 10. FIG. 3 is a perspective view showing a state where a seat 51 is mounted to a vehicle body frame 12, as viewed from obliquely downward.

Referring to FIGS. 1 to 3, the utility vehicle 10 includes the vehicle body frame 12, four seat frames 14 mounted to the vehicle body frame 12, seat bottoms 16 mounted to the four seat frames 14, respectively, and the seat backrests 18 mounted to the four seat frames 14, respectively. Each of the four independent seats S1-S4 includes the seat frame 14, the seat bottom 16 and the seat backrest 18. In this embodiment, the seats S1 and S2 at the front side are arranged side by side in a rightward and leftward direction, and the seats S3 and S4 are arranged side by side in the rightward and leftward direction, behind the seats S1 and S2, respectively. The seat 51 located at the front side and at the left side is a driver seat.

Figure 4:
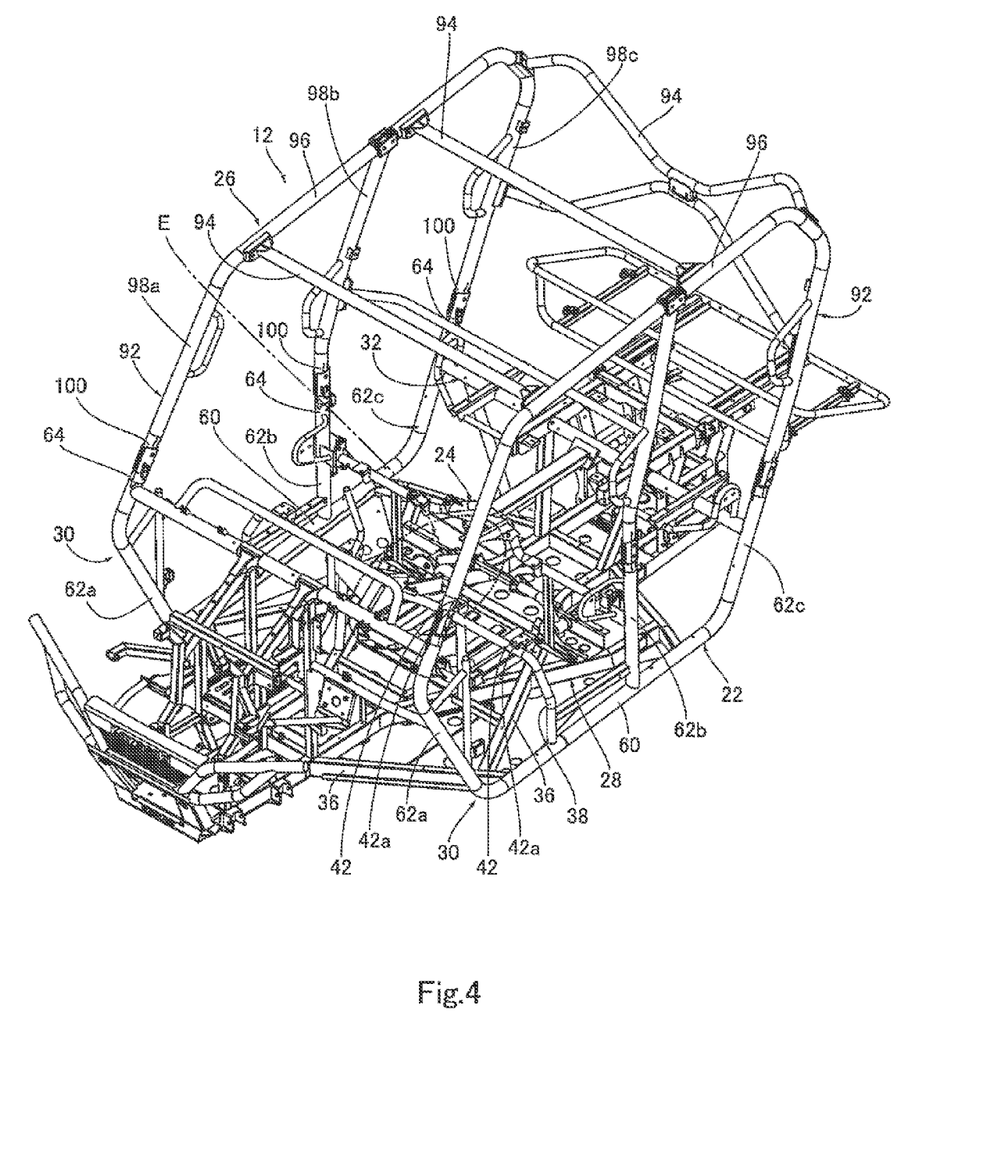
FIG. 4 is a perspective view showing a configuration of the vehicle body frame.
Figure 5:
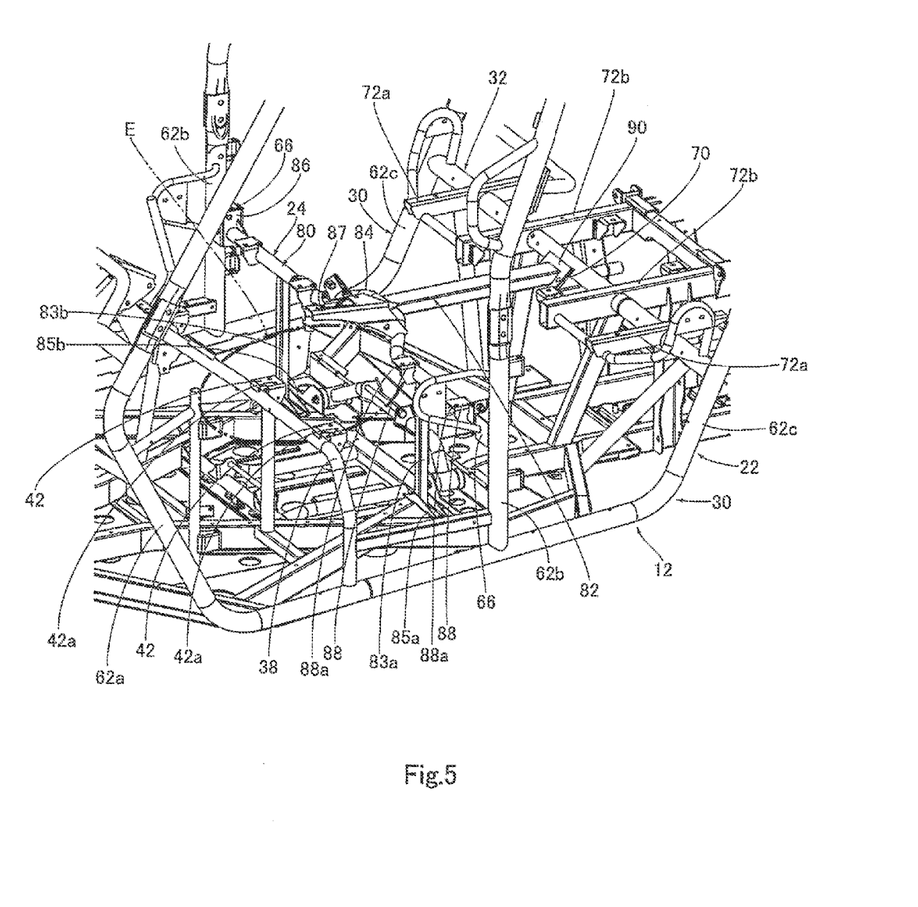
FIG. 5 is a perspective view showing a configuration of a part of the vehicle body frame.
Figure 6:
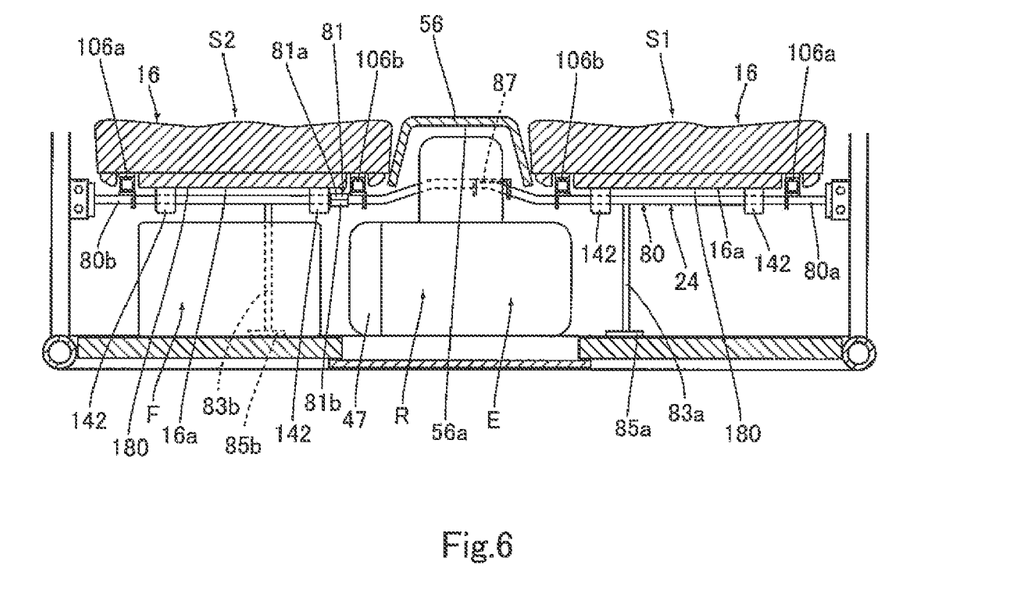
FIG. 6 is a cross-sectional view taken along line VI-VI in FIG. 2.

FIG. 4 is a perspective view showing a configuration of the vehicle body frame 12. FIG. 5 is a perspective view showing a configuration of a part of the vehicle body frame 12. FIG. 6 is a cross-sectional view taken along line VI-VI in FIG. 2. Referring to FIG. 4, the vehicle body frame 12 includes a main frame 22, a sub-frame 24 (FIG. 5) for reinforcing the main frame 22, and a cabin frame (e.g. a roll-over protective structure ROPS) 26.

As shown in FIG. 4, the main frame 22 includes a floor member 28 which is spaced apart from a road surface or a ground, a pair of right and left side members 30 which extend upward from right and left side portions of the floor member 28, and a cross member 32 for coupling the side members 30 to each other.

As shown in FIG. 2, the floor member 28 is a base member configured to support the engine E and the four seats S1-S4. As shown in FIG. 4, the floor member 28 includes a plurality of square pipes 36 with rectangular cross-sections, extending horizontally and being welded unitarily to each other. At a portion of an upper surface of the floor member 28, corresponding to a front end portion of each of the seats S1 and S2, an arch-shaped support pipe 38 is disposed to extend in the rightward and leftward direction and configured to support the seat frame 14. Each support pipe 38 is provided with two plates 42 arranged to be spaced apart from each other in the rightward and leftward direction. The plates 42 have holes 42a into which bolts 40 (FIG. 7) are inserted, respectively. Each of the two plates 42 has a flat upper surface.

Referring to FIG. 2, two front wheels 44 are suspended from the front portion of the floor member 28, two rear wheels 46 are suspended from the rear portion of the floor member 28, and an engine E is mounted at the center portion of the floor member 28. As shown in FIG. 6, a fuel tank F is disposed at one side (right side in this embodiment) of the engine E in the rightward and leftward direction. The engine E includes a CVT 47 (continuously variable transmission). A side surface of a cover (not shown) of the CVT 47 faces a side surface of the fuel tank F. As shown in FIG. 2, the four seats S1-S4 are arranged above the floor member 28 at right and left sides and at front and rear sides. A steering shaft 48 is provided forward relative to the seat S1. An electric power steering device 50 is coupled to a lower end portion of the steering shaft 48. A handle 52 is coupled to an upper end portion of the steering shaft 48. A lever 54 of a parking brake is provided at a right side of the seat S1. As shown in FIG. 6, a console box 56 is disposed between the seats S1 and S2 to cover the engine E.

As shown in FIG. 1, each side member 30 is configured to support the cabin frame (ROPS) 26, a front door 58a and a rear door 58b. As shown in FIG. 4, the side member 30 includes a side pipe element 60 extending in a forward and rearward direction at a side portion of the floor member 28 in the rightward and leftward direction, a first lower pillar pipe element 62a extending upward from a front end portion of the side pipe element 60, a second lower pillar pipe element 62b extending upward from a center portion of the side pipe element 60 in the forward and rearward direction, and a third lower pillar pipe element 62c extending upward from a rear end portion of the side pipe element 60. The side pipe element 60 and the lower pillar pipe elements 62a-62c are round pipes having circular cross-sections. The side pipe element 60 is welded to the square pipe 36 of the floor member 28. As shown in FIG. 3, connecting portions 64 having holes 64a into which bolts are inserted are provided at upper end portions of the lower pillar pipe elements 62a-62c, respectively. As shown in FIG. 5, a connecting portion 66 having a hole into which a bolt is inserted is provided at a vertical center portion of each of the second lower pillar pipe elements 62b.

Referring to FIG. 5, the cross member 32 is a pipe member for coupling third lower pillar pipe elements 62c of the pair of right and left side members 30. One end portion of the cross member 32 is welded to the third lower pillar pipe element 62c, while an opposite end portion thereof is coupled to the third lower pillar pipe element 62c. The cross member 32 is provided with a connecting portion 70 having a hole into which a bolt is inserted, at a center portion thereof in a longitudinal direction of the cross member 32. Two support pipes 72a and 72b extending in the forward and rearward direction are welded to portions of the cross member 32 respectively corresponding to the seats S3 and S4 (FIG. 2), to support the seat frame 14 (FIG. 2).

Referring to FIG. 5, the sub-frame 24 includes a cross member 80 extending in the rightward and leftward direction, a longitudinal member 82 provided behind the cross member 80 to extend in the forward and rearward direction, and two leg elements 83a and 83b supporting the cross member 80. The cross member 80 is a pipe member for coupling the second lower pillar pipe elements 62b of the right and left side members 30, behind the seat bottom 16. The cross member 80 includes a first pipe element 80a, a second pipe element 80b, and a joint 81 for coupling the first pipe element 80a to the second pipe element 80b. The joint 81 has a substantially cylindrical shape in which two elements 81a and 81b of a semi-cylinder shape are fastened to each other by fastener members (not shown) such as bolts. To couple the first pipe element 80a to the second pipe element 80b, an end portion of the first pipe element 80a is inserted into one receiver opening of the joint 81, an end portion of the second pipe element 80b is inserted into the other receiver opening of the joint 81, and then, the two elements 81a and 81b are firmly fastened by fastener members (not shown).

The cross member 80 has a bent portion 84 at a center portion (in this embodiment, a portion of the first pipe element 80a, the same occurs hereinafter) in the longitudinal direction such that the bent portion 84 is bent upward in a rearward direction to avoid interference with the engine E. Connecting portions 86 having holes into which bolts are inserted are provided at both ends of the cross member 80, respectively, in the longitudinal direction. The connecting portions 86 are coupled to the connecting portions 66 of the main frame 22, respectively, by bolts and others. A bracket 87 is welded to a longitudinal center portion of the cross member 80 to support the lever 54 (FIG. 2). Two plates 88 are welded to portions of the cross member 80 respectively corresponding to rear end portions of the seats S1 and S2 such that the two plates 88 are arranged to be spaced apart from each other in the rightward and leftward direction. The plates 88 have threaded holes 88a into which bolts 40 (FIG. 7) are threadingly engaged. The upper surfaces of the two plates 88 are flat supper surfaces. The longitudinal member 82 is a pipe member for coupling the cross member 80 to the cross member 32 of the main frame 22. A front end portion of the longitudinal member 82 is welded to the bent portion 84, and a connecting portion 90 having a hole into which a bolt is inserted is provided at a rear end portion of the longitudinal member 82. The connecting portion 90 is connected to the connecting portion 70 of the cross member 32 by bolts and the like. The leg elements 83a and 83b are rod-shaped elements for supporting the cross member 80. An upper end portion of the leg element 83a is welded to the first pipe element 80a of the cross member 80, while an upper end portion of the leg element 83b is welded to the second pipe element 80b of the cross member 80. Connecting portions 85a and 85b having holes into which bolts are inserted are provided at lower end portions of the leg elements 83a and 83b, respectively. The connecting portions 85a and 85b are connected to the upper surface of the floor member 28 by bolts and the like.

As shown in FIG. 4, the cabin frame (ROPS) 26 includes a pair of right and left side members 92 coupled to the pair of right and left side members 30, respectively, and a plurality of cross members 94 for coupling the side members 92 to each other. Each side member 92 includes a side pipe element 96 positioned opposite to the side pipe element 60 of the main frame 22, a first upper pillar pipe element 98a extending downward from a front end portion of the side pipe element 96, a second upper pillar pipe element 98b extending downward from a center portion of the side pipe element 96 in the forward and rearward direction, and a third upper pillar pipe element 98c extending downward from a rear end portion of the side pipe element 96. Connecting portions 100 having holes into which bolts are inserted are provided at lower end portions of the upper pillar pipe elements 98a-98c, respectively. The connecting portions 100 are connected to the connecting portions 64 of the side members 30, respectively.

As shown in FIGS. 1 and 2, each of the seats S1-S4 includes the seat frame 14, the seat bottom 16, and the seat backrest 18. In this embodiment, the seat frames 14 of the left seats S1 and S3 have the same structure, while the seat frames 14 of the right seats S2 and S4 have the same structure. The seat frame 14 of the left seat S1 and the seat frame 14 of the right seat S2 are symmetric in the rightward and leftward direction, while the seat frame 14 of the left seat S3 and the seat frame 14 of the right seat S4 are symmetric in the rightward and leftward direction. The seat bottoms 16 of the seats S1-S4 have the same structure and the seat backrests 18 of the seats S1-S4 have the same structure. Hereinafter, the seat frame 14, the seat bottom 16 and the seat backrest 18 of the seat S1 will be described hereinafter, by way of example. The seats S2-S4 will not be described specifically.

Figure 7:
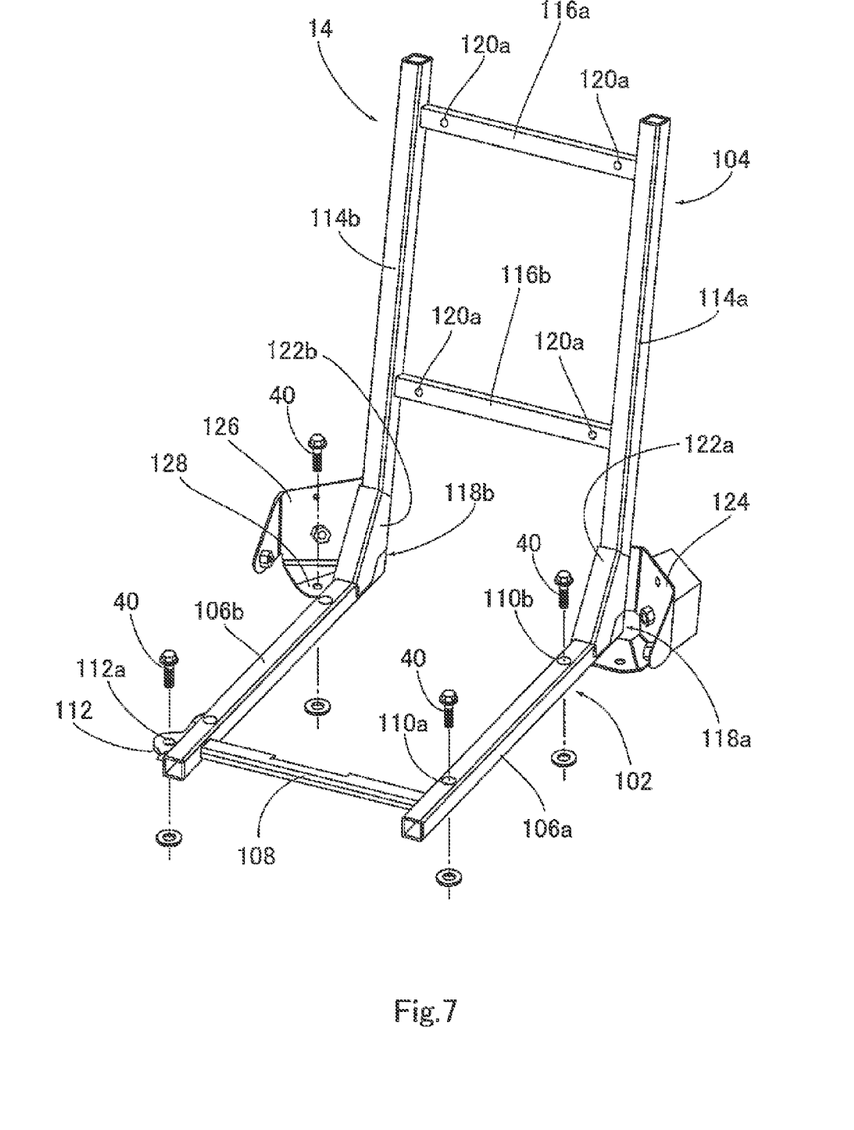
FIG. 7 is a perspective view showing a configuration of a seat frame.

FIG. 7 is a perspective view showing a configuration of the seat frame 14. Referring to FIG. 7, the seat frame 14 includes a seat bottom support member 102 for supporting the seat bottom 16 and a seat backrest support member 104 for supporting the seat backrest 18.

As shown in FIG. 7, the seat bottom support member 102 includes two support pipes 106a and 106b arranged to extend in the forward and rearward direction in parallel with each other and a coupling pipe 108 for coupling the two support pipes 106a and 106b to each other. The support pipes 106a and 106b are square pipes having rectangular cross-sections. As shown in FIG. 3, the support pipes 106a and 106b are designed to have a length larger than a distance between the support pipe 38 of the main frame 22 and the cross member 80 of the sub-frame 24. As shown in FIG. 7, the support pipe 106a is provided with holes 110a and 110b which are spaced apart from each other in the forward and rearward direction. Bolts 40 are inserted into the holes 110a and 110b, respectively. A plate 112 is attached to an outer side surface of a front end portion of the support pipe 106b, and has a hole 112a into which the bolt 40 is inserted. The coupling pipe 108 is a square pipe having a rectangular cross-section. One end portion of the coupling pipe 108 is welded to a front end portion of the support pipe 106a, while an opposite end portion thereof is welded to a front end portion of the support pipe 106b.

Figure 11:
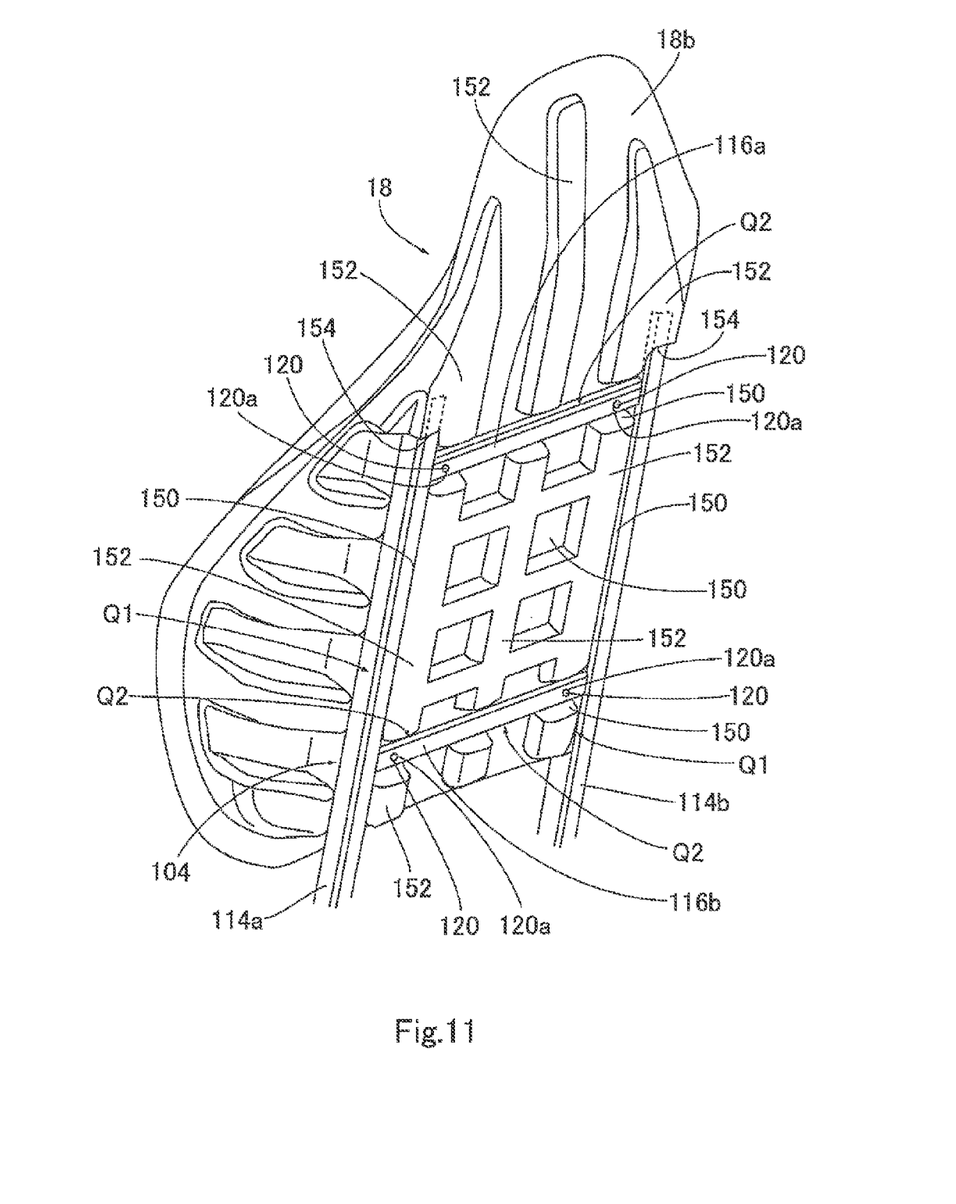
FIG. 11 is a perspective view showing a state where a seat backrest is fastened to the seat frame.

As shown in FIG. 7, the seat backrest support member 104 includes two support pipes 114a and 114b arranged to extend vertically in parallel with each other, and two coupling pipes 116a and 116b for coupling the support pipes 114a and 114b to each other. The support pipes 114a and 114b are square pipes having rectangular cross-sections. The support pipe 114a is connected to the support pipe 106a of the seat bottom support member 102 via a bent portion 118a, while the support pipe 114b is connected to the support pipe 106b of the seat bottom support member 102 via a bent portion 118b. Each of the coupling pipes 116a and 116b is a square pipe having a rectangular cross-section. One end portion of each of the coupling pipes 116a and 116b is welded to the support pipe 114a, while an opposite end portion of each of the coupling pipes 116a and 116b is welded to the support pipe 114b. As shown in FIG. 11, the positions of the two coupling pipes 116a and 116b are designed according to a shape of the seat backrest 18. In this embodiment, the coupling pipe 116a is located slightly above a vertical center portion of the seat backrest 18, while the coupling pipe 116b is located at a lower portion of the seat backrest 18. Each of the coupling pipes 116a and 116b has holes 120a into which bolts 120 are inserted, respectively.

As shown in FIG. 7, at the bent portion 118a or in the vicinity of the bent portion 118a, a metal-made reinforcement plate 122a for reinforcing the bent portion 118a and a seat belt accommodating portion 124 for accommodating a seat belt (not shown) are fastened to the support pipe 106a of the seat bottom support member 102 and the support pipe 114a of the seat backrest support member 104. In this embodiment, the seat belt accommodating portion 124 is a retractor which winds back the seat belt. At the bent portion 118b or in the vicinity of the bent portion 118b, a metal-made reinforcement plate 122b for reinforcing the bent portion 118b and a seat belt fastening portion 126 for fastening the seat belt are fastened to the support pipe 106b of the seat bottom support member 102 and the support pipe 114b of the seat backrest support member 104. The reinforcement plate 122b has a hole 128 into which the bolt 40 (FIG. 7) is inserted.

Figure 8:
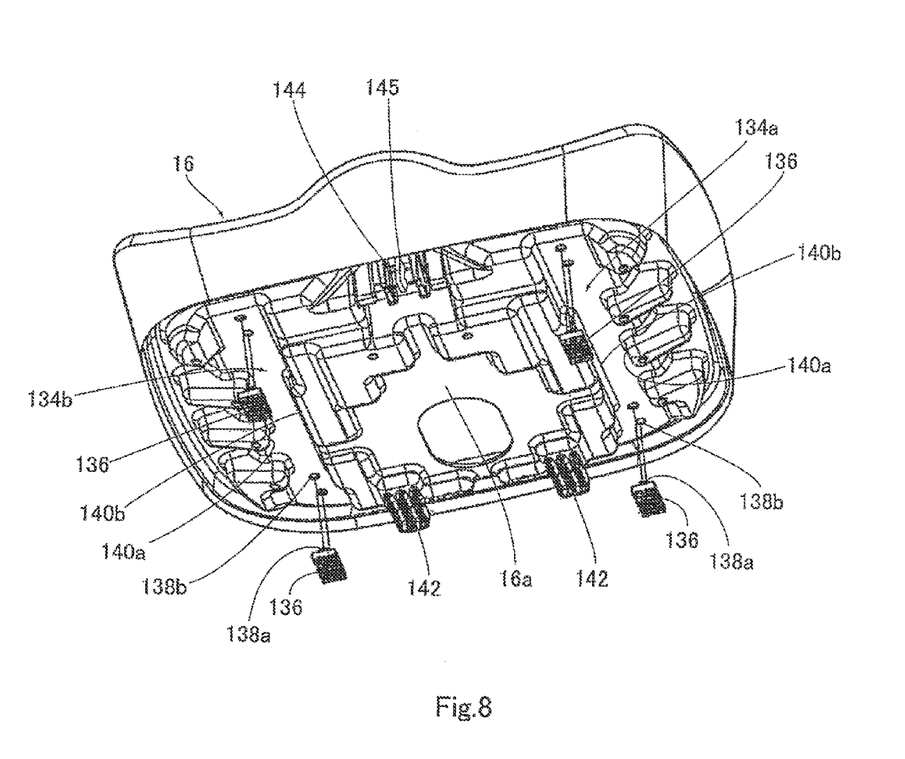
FIG. 8 is a perspective view showing a configuration of a seat bottom, as viewed from obliquely downward.

FIG. 8 is a perspective view showing the seat bottom 16 as viewed obliquely downward. The seat bottom 16 is formed unitarily using synthetic resin. An upper surface of the seat bottom 16 has a shape in which right and left side portions are higher than a center portion to allow the passenger to be seated thereon comfortably. Grooves 134a and 134b are formed on portions of a lower surface 16a of the seat bottom 16 which are opposite to an upper surface of the seat bottom support member 102 (FIG. 7), to extend in the forward and rearward direction. The grooves 134a and 134b are configured to accommodate the support pipes 106a and 106b (FIG. 7), respectively. At least one rubber damper 136, in this embodiment, two rubber dampers 136 are provided on the bottom surface of each of the grooves 134a and 134b such that the dampers 136 are spaced apart from each other in the forward and rearward direction. Protrusions 138a are formed on the upper surfaces of the dampers 136, respectively. Holes 138b are formed on the bottom surfaces of the grooves 134a and 134b, respectively. The protrusions 138a of the dampers 136 are fitted into the holes 138b, respectively. On the inner side surfaces of the grooves 134a and 134b, there are formed opposed surfaces 140a and 140b which are respectively positioned on opposite sides of the side surfaces of the support pipes 106a and 106b (FIG. 7) of the seat frame 14 (FIG. 7), in respective rightward and leftward directions, when the seat bottom is installed.

As shown in FIG. 8, two second engagement mechanisms 142 are provided on the lower surface 16a of a rear portion of the seat bottom 16 such that they are spaced apart from each other in the rightward and leftward direction. The second engagement mechanisms 142 are engaged with the cross member 80 (FIG. 5) from below. In addition, a first engagement mechanism 144 and a disengagement mechanism 145 are provided on the lower surface 16a of a front portion of the seat bottom 16. The first engagement mechanism 144 is engaged with the coupling pipe 108 (FIG. 7) of the seat frame 14 (FIG. 7) from below. The disengagement mechanism 145 is configured to disengage the first engagement mechanism 144 as desired.

As shown in FIG. 3, the second engagement mechanism 142 includes a first portion 142a protruding downward from the lower surface 16a of the seat bottom 16, and a second portion 142b protruding rearward from a lower end portion of the first portion 142a. When the seat bottom 16 is mounted to the seat bottom support member 102 of the seat frame 14, the second engagement mechanism 142 of a substantially L-shape, formed by the first portion 142a and the second portion 142b, is pressed against the cross member 80 from forward.

Figure 9:
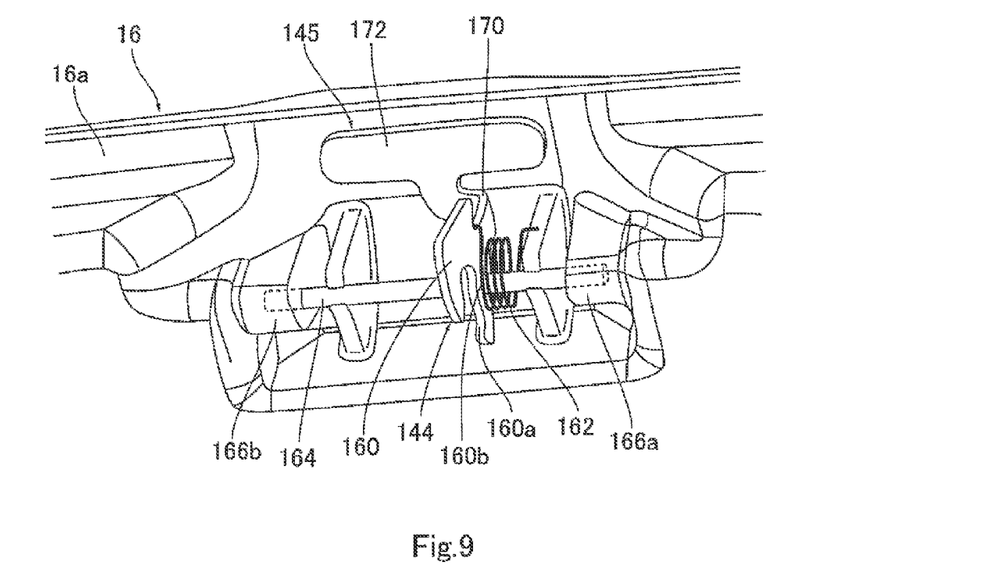
FIG. 9 is an enlarged perspective view showing a first engagement mechanism and a disengagement mechanism provided at the seat bottom, as viewed from obliquely downward.
Figure 10:
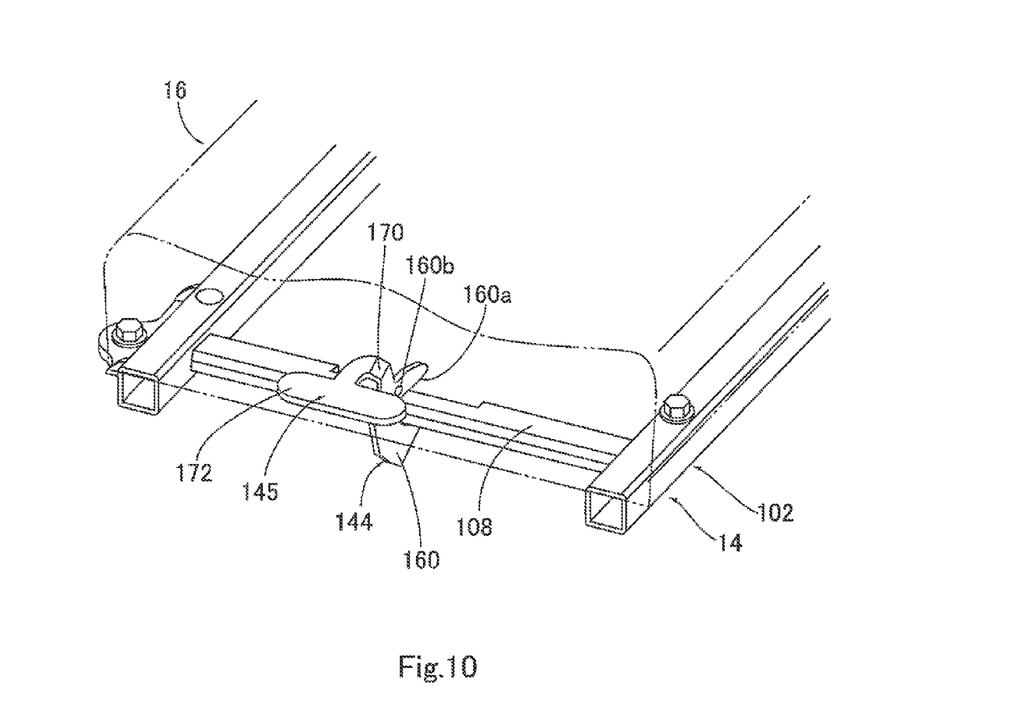
FIG. 10 is a perspective view showing a state where the first engagement mechanism is engaged with the seat frame.

FIG. 9 is an enlarged perspective view showing the first engagement mechanism 144 and the disengagement mechanism 145 which are provided on the front end portion of the lower surface 16a of the seat bottom 16, as viewed from obliquely downward. FIG. 10 is a perspective view showing a state where the first engagement mechanism 144 is engaged with the seat frame 14. As shown in FIG. 9, the first engagement mechanism 144 includes an engagement plate 160 engaged with the coupling pipe 108 (FIG. 10) of the seat frame 14 from below, a coil spring 162 configured to bias the engagement plate 160 in one direction, a support shaft 164 configured to rotatably support the engagement plate 160 and the coil spring 162, and two bearings 166a and 166b formed integrally with the seat bottom 16. The engagement plate 160 is a plate-shaped member having a substantially-U-shaped recess 160a. The engagement plate 160 is provided with a through-hole 160b into which the support shaft 164 is inserted. The support shaft 164 is inserted into the through-hole 160b of the engagement plate 160 and into a hollow space of the coil spring 162. Both end portions of the support shaft 164 are supported by the bearings 166a and 166b. One end portion of the coil spring 162 is engaged with the engagement plate 160, while an opposite end portion thereof is engaged with the seat bottom 16. The coil spring 162 biases an opening of the recess 160a provided on the engagement plate 160 to orient it in a rearward direction.

As shown in FIGS. 9 and 10, the disengagement mechanism 145 is configured to disengage the first engagement mechanism 144 from the coupling pipe 108 to mount the seat bottom 16 to the seat bottom support member 102 or disengage the seat bottom 16 from the seat bottom support member 102. The disengagement mechanism 145 is integral with the first engagement mechanism 144. As shown in FIG. 10, the disengagement mechanism 145 includes an arm 170 extending obliquely upward from a region of the engagement plate 160 in the vicinity of the through-hole 160b and an operation portion 172 provided at a front end portion of the arm 170, in a state where the first engagement mechanism 144 is engaged. The operation portion 172 is operated by the operator's fingers. In this embodiment, the operation portion 172 has a plate shape extending in the rightward and leftward direction. When the operator lifts the operation portion 172 while holding a lower surface of the operation portion 172 with the fingers, the resulting force is transmitted to the engagement plate 160 via the arm 170. Thereupon, the engagement plate 160 is rotated against a biasing force applied by the coil spring 162 (FIG. 9), and the opening of the recess 160a is oriented in a downward direction, thereby disengaging the first engagement mechanism 144 from the coupling pipe 108. Therefore, as shown in FIG. 10, by merely lifting the operation portion 172 in a state where the seat bottom 16 is mounted to the seat bottom support member 102, the seat bottom 16 can be detached from the seat bottom support member 102.

FIG. 11 is a perspective view showing a state where the seat backrest 18 is fastened to the seat frame 14. Referring to FIG. 11, a back surface 18b of the seat backrest 18 has a plurality of recesses 150 and a plurality of convex portions 152. The recesses 150 are continuous vertically to form first accommodating spaces Q1 on the back surface 18b to respectively correspond to the support pipes 114a and 114b, respectively. The recesses 150 are continuous in the rightward and leftward direction to form second accommodating spaces Q2 on the back surface 18b to respectively correspond to the coupling pipes 116a and 116b, respectively. Holes 154 are formed on lower surfaces of the convex portions 152 provided above the first accommodating spaces Q1, to communicate with the first accommodating spaces Q1, respectively. Tip end portions of the support pipes 114a and 114b accommodated into the first accommodating spaces Q1 are inserted into the convex portions 152 through the holes 154, respectively. Then, the seat backrest 18 is fastened to the seat backrest support member 104 using the bolts 120 inserted into the holes 120a provided on the coupling pipes 116a and 116b, and the like.

Referring to FIG. 3, when the seat S1 is mounted to the vehicle body frame 12, the front portions of the two support pipes 106a and 106b of the seat frame 14 are placed on the support pipes 38 of the main frame 22, and their rear end portions are placed on the cross member 80 of the sub-frame 24. Then, as shown in FIG. 7, the four bolts 40 are inserted into the holes 110a, 110b, 112a and 128 of the seat frame 14 and into the holes 42a, 88a, 42a and 88a (FIG. 5) of the vehicle body frame 12 (FIG. 3), and the seat frame 14 is fastened to the vehicle body frame 12 (FIG. 3) using these bolts 40. Then, as shown in FIG. 3, the seat bottom 16 is fastened to the cross member 80 and to the seat frame 14 by the first engagement mechanism 144 and the second engagement mechanisms 142. Then, as shown in FIG. 11, the seat backrest 18 is fastened to the seat frame 14 using the bolts 120. The seats S2 to S4 are mounted to the vehicle body frame 12 in the same manner.

As shown in FIG. 6, in a state where the seats S1 and S2 are mounted to the vehicle body frame 12, the engine E disposed in the engine room R is covered with the seat bottom 16 constituting the seat S1 and the seat bottom 16 constituting the seat S2. In other words, an upper wall surface 180 of the engine room R is defined by at least a portion of the lower surface 16a of the seat bottom 16 constituting the left seat S1, a lower surface 56a of the console box 56, and at least a portion of the lower surface 16a of the seat bottom 16 constituting the right seat S2. In this embodiment, at least a portion of the lower surface 16a of the seat bottom 16 constituting each of the seats S1 and S2 is opposite to, i.e., faces, the engine E disposed in the engine room R in a vertical direction, without any component or member intervening between the engine E and the lower surface 16a. FIG. 6 shows the cross-section taken along line VI-VI in FIG. 2. Therefore the seat S1 (driver seat) is depicted at the right side and the seat S2 is depicted at the left side.

Figure 12:
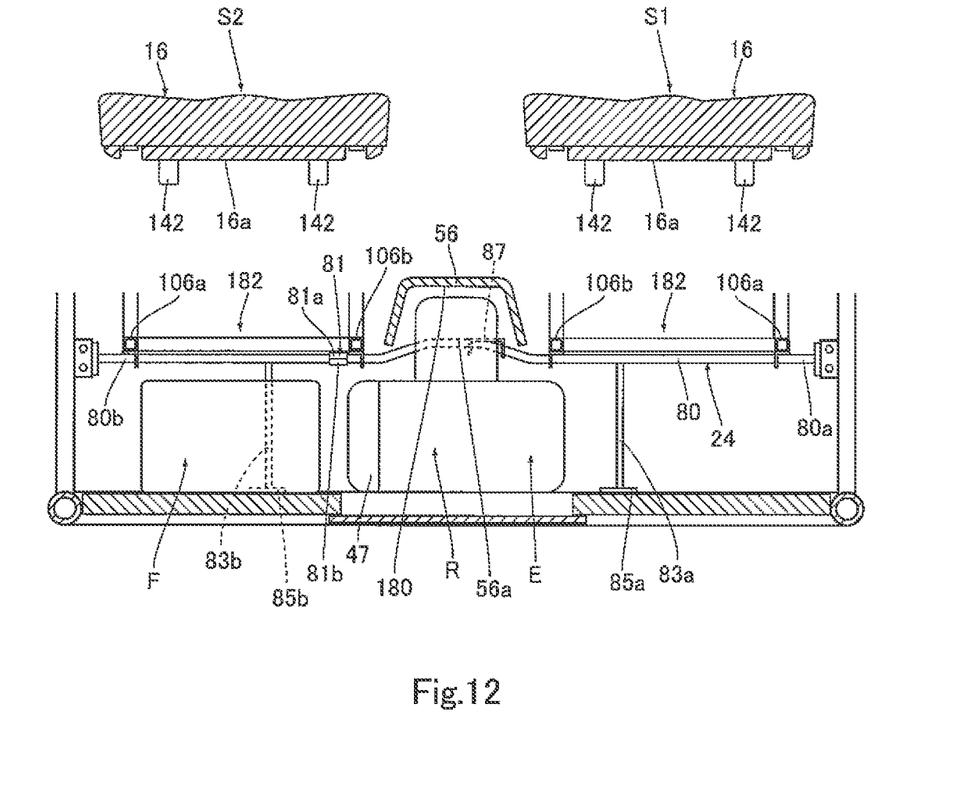
FIG. 12 is a cross-sectional view showing an opening formed on a portion of an upper wall surface of an engine room, corresponding to FIG. 6.

As shown in FIG. 6, in accordance with this embodiment, since a portion of the upper wall surface 180 of the engine room R in which the engine E is disposed is defined by at least a portion of the lower surface 16a of the seat bottom 16, an opening 182 (FIG. 12) can be provided on a portion of the upper wall surface 180 of the engine room R by merely detaching the seat bottom 16. As shown in FIG. 12, when the engine E is maintained, the engine E is easily accessible through the opening 182. In addition, as shown in FIGS. 9 and 10, the first engagement mechanism 144 can be easily disengaged by the disengagement mechanism 145. Therefore, the seat bottom 16 can be detached easily and quickly when the engine E is maintained.

In this embodiment, since a portion of the lower surface 16a of the seat bottom 16 constituting the right seat S2 is opposite to, i.e., faces, the CVT 47 in the vertical direction without any component or member intervening between the lower surface 16a and the CVT 47, the opening 182 can be provided right above the CVT 47 by merely detaching the seat bottom 16. Therefore, the CVT 47 is easily accessible through the opening 182 although the fuel tank F is disposed at the right side of the engine E. By removing a cover (not shown) provided on a side surface of the CVT 47, a belt tension of the CVT 47 can be easily adjusted. When the belt tension of the CVT 47 is adjusted, firstly, the seat S2 is detached from the vehicle body frame 12. Then, the second pipe element 80b of the cross member 80 constituting the sub-frame 24 is detached, and the fuel tank F is detached. Then, the cover of the CVT 47 is detached. After that, the belt tension is adjusted.

As shown in FIG. 8, the rubber dampers 136 can prevent generation of a noise at a contact portion between the seat bottom 16 and the seat bottom support member 102. Because of a frictional force acting on a contact surface of the dampers 136 and the seat bottom support member 102, displacement of the seat bottom 16 in the forward and rearward direction and in the rightward and leftward direction is suppressed, and as a result, the seat bottom 16 is firmly and stably fastened to the seat bottom support member 102. Moreover, since the rubber dampers 136 can be supported by the flat surface of the seat bottom support member 102 constituted by the square pipes, it is possible to prevent a localized force from being applied to the dampers 136. As a result, a life of the damper 136 can be increased.

Although the four seats S1 to S4 arranged at the front and rear sides and at the right and left sides in the above embodiment, the number and arrangement of the seats may be suitably changed as desired. For example, only the seats S1 and S2 may be arranged at the right and left sides, or otherwise only the seats S1 and S3 may be arranged at the front and rear sides in a two-seated utility vehicle. Moreover, the lower surface 16*a* of the seat bottom 16 constituting each of the seats S1 and S2 need not be opposite to, i.e., facing, the engine E in the vertical direction without any component or member between the engine E and the lower surface 16*a*, but the entire of the lower surface 16*a* of the seat bottom 16 may be positioned to deviate from a location just above the engine E.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A utility vehicle comprising:
a vehicle body frame to which an engine is mounted;
a seat frame fastened to the vehicle body frame and including a seat bottom support member; and
a seat bottom detachably fastened to the seat bottom support member;
wherein a portion of an upper wall surface of an engine room in which the engine is disposed is defined by at least a portion of a lower surface of the seat bottom;
wherein the seat bottom includes a first engagement mechanism engaged with the seat frame and a disengagement mechanism configured to disengage the first engagement mechanism;
wherein the vehicle body frame includes a pair of side members provided at right and left sides of a vehicle body and a cross member configured to couple the pair of side members behind the seat bottom;
wherein the first engagement mechanism and the disengagement mechanism are provided at a front portion of the seat bottom; and
wherein a second engagement mechanism is provided at a rear portion of the seat bottom and is configured to be engaged with the cross member.

2. The utility vehicle according to claim 1,
wherein at least the portion of the lower surface of the seat bottom faces the engine disposed in the engine room, without a component or a member intervening between the engine and the lower surface.

3. The utility vehicle according to claim 1, comprising:
a front seat and a rear seat which are arranged on the vehicle body frame such that the front seat is positioned at a front side and the rear seat is positioned at a rear side;
wherein the cross member is configured to support a rear portion of the seat frame constituting the front seat.

4. The utility vehicle according to claim 1,
wherein the seat bottom includes a pair of opposed surfaces which are respectively positioned on opposite sides of side surfaces of the seat bottom support member, in respective rightward and leftward directions.

5. The utility vehicle according to claim 1,
wherein a rubber damper is provided at a portion of the lower surface of the seat bottom which is opposite to an upper surface of the seat bottom support member.

* * * * *